United States Patent
Iverson

(10) Patent No.: US 7,601,266 B2
(45) Date of Patent: Oct. 13, 2009

(54) METHOD OF PROMOTING UNRESTRICTED FLOW OF IRRIGATION WATER THROUGH IRRIGATION NETWORKS

(75) Inventor: Carl E. Iverson, Olympia, WA (US)

(73) Assignee: CH₂O Incorporated, Olympia, WA (US)

( * ) Notice: Subject to any disclaimer, the term of this patent is extended or adjusted under 35 U.S.C. 154(b) by 364 days.

(21) Appl. No.: 11/407,414

(22) Filed: Apr. 20, 2006

(65) Prior Publication Data

US 2007/0257127 A1 Nov. 8, 2007

(51) Int. Cl.
*C02F 1/76* (2006.01)
*C02F 5/14* (2006.01)

(52) U.S. Cl. .......... 210/696; 210/698; 210/699; 210/700; 210/747; 210/753; 210/754; 210/756; 210/758; 210/759; 210/760; 210/764; 422/28; 422/37

(58) Field of Classification Search .......... 210/699
See application file for complete search history.

(56) References Cited

U.S. PATENT DOCUMENTS

| | | | |
|---|---|---|---|
| 5,047,078 A * | 9/1991 | Gill | 71/11 |
| 5,930,950 A | 8/1999 | Iverson, Jr. et al. | |
| 6,036,740 A * | 3/2000 | Miller et al. | 71/32 |
| 6,096,226 A * | 8/2000 | Fuchs et al. | 210/759 |
| 6,238,573 B1 * | 5/2001 | Miller et al. | 210/756 |
| 6,350,410 B1 * | 2/2002 | Iverson et al. | 422/29 |
| 6,767,470 B2 * | 7/2004 | Iverson et al. | 210/699 |
| 7,033,510 B2 * | 4/2006 | Cilliers et al. | 210/754 |
| 7,252,769 B2 * | 8/2007 | Dickinson | 210/699 |
| 7,266,924 B2 * | 9/2007 | Van De Lande | 47/62 R |
| 2002/0014463 A1 | 2/2002 | Iverson et al. | |
| 2003/0200997 A1 | 10/2003 | Gill et al. | |

FOREIGN PATENT DOCUMENTS

| | | |
|---|---|---|
| EP | 0 380 171 A1 | 8/1990 |
| WO | WO 96/32523 A1 | 10/1996 |
| WO | WO 02/12130 A1 | 2/2002 |

\* cited by examiner

*Primary Examiner*—Peter A Hruskoci
(74) *Attorney, Agent, or Firm*—Seed IP Law Group PLLC; Karl R. Hermanns

(57) ABSTRACT

A biofilm reducing agent (BRA) and a mineral deposit distorting agent (MDDA) are admixed to irrigation water in amounts sufficient to substantially eliminate biofilm formation in the emitters (14) of an irrigation system (10) and produce amorphous mineral deposits in the emitters that are easily washed away by the irrigation water as it flows through the emitters (14). The BRA may be an oxidizer selected from the group consisting of chlorine, ozone, chlorine dioxide, hydrogen peroxide, hydroxy peracitic acid, iodine, bromine, hydrogen dioxide, chlorate salts, chlorite salts and hypochlorite compounds and mixtures thereof. The MDDA is a phosphonate selected from the group comprising AMP, ATMP, HEDP, EDTMPA, HMDTMPA, DETPMPA, BHMPTMPA, PBTC, HPA, PCA, NTMP, and DTPMP.

12 Claims, 1 Drawing Sheet

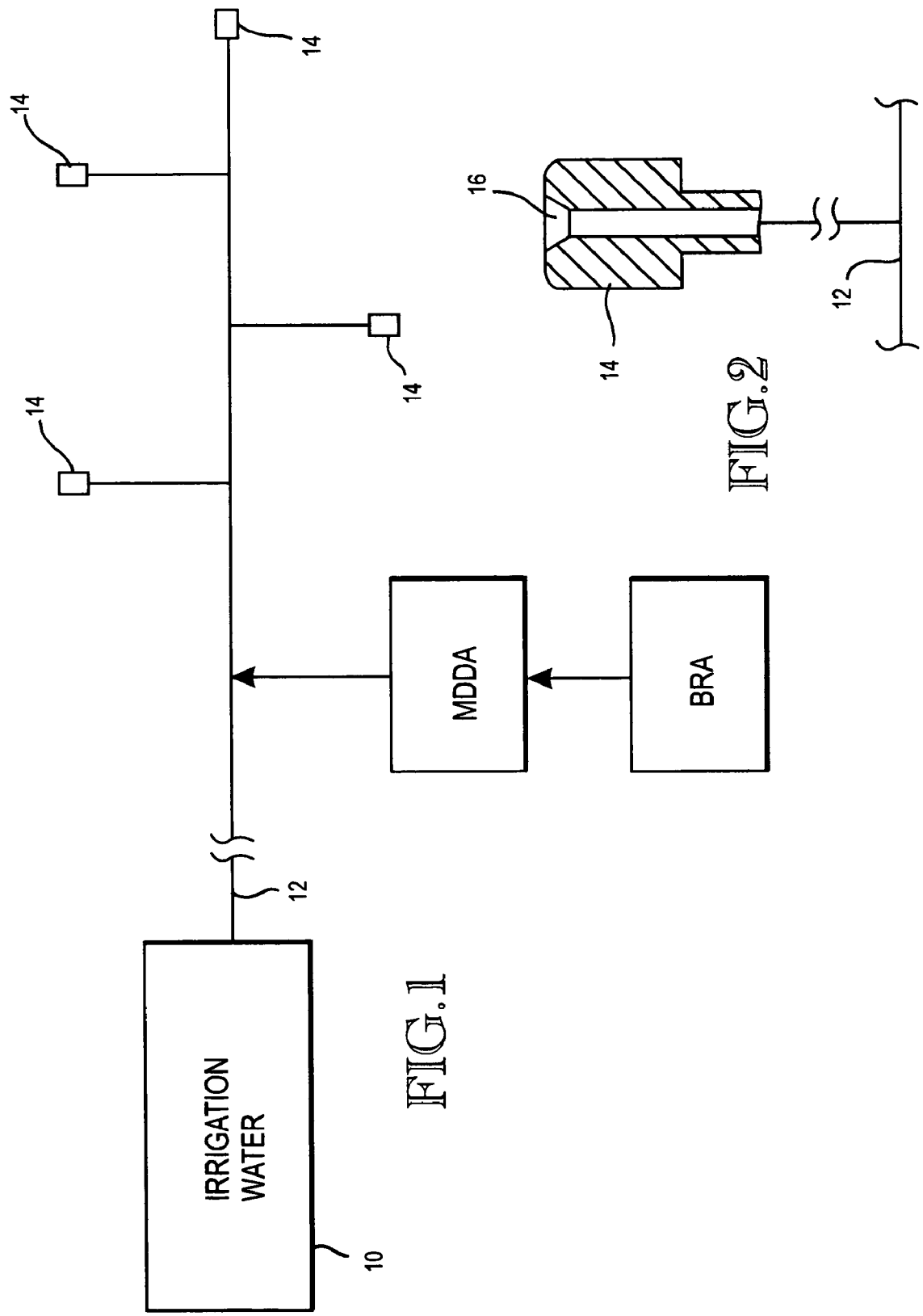

METHOD OF PROMOTING UNRESTRICTED FLOW OF IRRIGATION WATER THROUGH IRRIGATION NETWORKS

TECHNICAL FIELD

This invention relates to a method of promoting unrestricted flow of irrigation water through conduits, filters and emitters in an irrigation network. More particularly, it relates to the treatment of irrigation water for substantially eliminating biofilm formation in the emitters, and for causing mineral deposits in the network to be amorphous so that they can be easily washed away by the irrigation water.

BACKGROUND OF THE INVENTION

Irrigation water is commonly pumped through filters and conduits to emitters which discharge the irrigation water onto the plants. It is critical that the designed flow rates be maintained, particularly in low flow (e.g. drip) irrigation networks. In these networks, even a small drop in the flow rate will damage the plants. As explained in U.S. Pat. No. 6,350,410 B1, granted Feb. 26, 2002, to Carl E. Iverson and Joyce Prindle, biological fouling can develop buildups resulting in the loss of flow rate through the irrigation network. It is common to feed micronutrients such as iron to promote plant growth. When mineral micronutrients are being fed to the plants, oxidizers cause them to precipitate out of solution, compounding the plugging of low flow emitters. Oxidizers such as chlorine gas and hydrogen peroxide have been used to treat the irrigation water but such treatment has had a limited effect on biofilms and a negative affect on the formation of mineral deposits. Oxidizing compounds do not prevent crystalline mineral structures at emitter tips.

There is a need for a method of promoting unrestricted flow of irrigation water through the low flow rate emitters that discharge the water onto the plants. Specifically, there is a need for effectively eliminating both biofilm and mineral deposit restrictions and plugging of low flow emitters in irrigation networks. A principal object of this invention is to meet this need.

BRIEF SUMMARY OF THE INVENTION

The present invention provides a method of substantially preserving unrestricted flow of irrigation water through the emitters of an irrigation network. The invention comprises admixing a biofilm reducing agent (BRA) and a mineral deposit distorting agent (MDDA) to the irrigation water. The BRA agent substantially eliminates biofilm formation in the system. The MDDA agent causes mineral deposits that are formed to be amorphous. The BRA and MDDA agents are admixed to the irrigation water in amounts sufficient to substantially eliminate biofilm formation in the emitters and produce amorphous mineral deposits in the emitters that are easily washed away by the irrigation water as it flows through the emitters.

The BRA agent may be an oxidizer selected from the group consisting of chlorine, ozone, chlorine dioxide, hydrogen peroxide, peracetic acid, iodine, bromine, hydrogen dioxide, chlorate salts, chlorite salts and hypochlorite compounds and mixtures thereof. A preferred form of oxidizer is chlorine dioxide.

The MDDA agent is selected from the group consisting of phosphonate compounds, phosphonic acid compounds, derivative of phosphorus, blends of phosphonate phosphorus derivatives, and phosphonic acid compounds, anti-scalent polymers, citric acid, acetic acid, mineral acid and mixtures thereof. The phosphonate may be selected from the group consisting of, but not limited to; ATMP, HEDP, EDTMPA, HMDTMPA, DETPMPA, PHMPTMPA, PBTC, HPA, PCA, NTMP, and DTPMP. A preferred phosphonate is 2 phosphonobutane-12, 4 tricarboxylic acid (PBTC).

These and other objects, advantages, and features will become apparent from the detailed description of the best mode for carrying out the invention, set forth below.

BRIEF DESCRIPTION OF THE SEVERAL VIEWS OF THE DRAWINGS

In the drawing, like element designations refer to like parts throughout the several views, and:

FIG. 1 is a system diagram showing irrigation water flowing into a conduit and BRA and MDDA agents being introduced into the conduit and admixed with the irrigation water, such diagram also showing a plurality of emitters connected to the conduit for receiving and discharging irrigation water; and FIG. 2 is an enlarged scale sectional view taken through an emitter, showing a relatively small diameter passageway extending through the emitter.

DETAILED DESCRIPTION OF THE ILLUSTRATED EMBODIMENT

Referring to FIG. 1, a source of irrigation water 10 is shown to be connected to a conduit 12 that leads to a plurality of emitters 14. FIG. 1 also shows BRA and MDDA being introduced into the conduit 12, in admixture with the irrigation water. The irrigation water is pumped through the conduit 12 to and through the emitters 14. The constructional details of the emitters 14 are not important. However, the emitters 14 will have relatively small size passageways 16 for the irrigation water, making them susceptible to plugging if the irrigation water does not receive the treatment provided by the present invention. For the purpose of this invention, it is important that the irrigation water, the BRA and MDDA agents form a mixture that flows through the conduit 12 to the emitters 14.

The irrigation system shown schematically by FIG. 1 is designed to supply water, fertilizer, micronutrients, etc. at predetermined flow rates for the particular plants that are being watered. The illustrated conduit 12 may be only one of a number of conduits 12 that lead from the source 10 to the plants that are to receive water, nutrients, etc. The plants may be in a hothouse, a greenhouse, a vineyard, or in fields.

The conduits 12 and emitters 14 are susceptible to being restricted and/or blocked by both biofilms and crystalline mineral deposits formed in the emitters 14. Biofilms are both organic and inorganic in nature. They are formed by one or more species of bacteria, fungi, algae, protozoa, moss, mycelia, rotatoria, precipitates of fertilizers and source water minerals, viruses, spores, and by debris. The different species assist each other with enzymes that breakdown food supplies that no single species could assimilate alone. Waste products from one species form a food source for another species. Pathogens in biofilms are protected by polysaccharide films (extracellular polymetric compounds) generated by bacteria. It is common to add chelated micronutrients (e.g. chelated iron) to the irrigation water to promote plant growth. Iron and trace metal salts are food for bacteria such as iron oxidizing bacteria and sulfate reducing bacteria (SRBs). Thus, they exacerbate the emitter blocking problem by "feeding" the biofilm. Also, when chelated mineral micronutrients are added to the water, oxidizing agents, including chlorine dioxide, cause them to precipitate out of solution, enhancing the plugging of the low flow emitters 14.

Typical sources of the BRA agent are oxidizers selected from the group consisting of chlorine, ozone, chlorine dioxide, hydrogen peroxide, peracitic acid, iodine, bromine, hydrogen dioxide, chlorate salts, chlorite salts and hypochlorite compounds and mixtures thereof. Example suppliers of the MDDA agent are phosphonates from the group consisting of phosphonate compounds, phosphonic acid compounds, derivative of phosphorus, blends of phosphonate phosphorus derivatives, and phosphonic acid compounds, anti-scalent polymers (e.g., polvacrylic acid), citric acid, acetic acid, mineral acid and mixtures thereof. The phosphonates may be derived from phosphorus or selected from the group comprising AMP, ATMP, HEDP, EDTMPA, HMDTMPA, DETPMPA, BHMPTMPA, PBTC, HPA and PCA. The following is a list of phosphonates from the Wikipedia Online Encyclopedia: TABLE-US-00001 PHOSPHONATE COMMERCIAL COMMON NAME NAME NAME CAS #Aminotri (methylemephosphonic Acid) Dequest 2000 ATMP 6419-19-8 1-Hydroxyethylidene-1,1-Dequest 2010 HEDP 2809-21-4 diphosphonic Acid Ethylenediaminetetra Dequest 2041 EDTMPA 1429-50-1 (methylemephosphonic Acid) Hexamethylenediaminetetra Dequest 2054 HMDTMPA 38820-59-6 (methylemephosphonic Acid) Diethylenetriaminepenta Dequest 2060 DETPMPA 15827-60-8 (methylemephosphonic Acid) Bis(hexamethylene triamine Dequest 2090 BHMPTMPA 34690-00-1 penta(methylemephosphonic acid)) 2-Phosphonobutane-1,2,4-Dequest 7000 PBTC 37971-36-1 tricarboxylic Acid 2-Hydroxy Phosphonoacetic Acid Belcor 575, HPA 23783-26-8 Belelene 494 Phosphinocarboxylic Acid Belelene 500, PCA 71050-62-9 Beisperse 161 tion of the sodium chlorite into chlorine dioxide. The feed of the two solutions to the third container was 1500 milliliters per hour of each solution was introduced into a container. The reacted solution from the container was introduced into a 300 gpm flowing water irrigation network that included emitters through which the irrigation water was discharged. This irrigation water mixture was used by a greenhouse grower to irrigate plants in greenhouses. The grower saved a significant amount of money by substantially eliminating plant loss, maintenance costs to clean the emitters, filters and the cost of replacing the emitters. The mixture flowing through the emitters contained substantially 3.0 ppm chlorine dioxide, substantially 6.0 ppm mixed oxidants and substantially 6.0 ppm phosphonate. When these levels were maintained, all issues with biofilms, crystalline minerals and fertilizers plugging the emitters were eliminated. All mineral deposits were amorphous deposits that were washed away by the irrigation water flowing through the emitters.

EXAMPLE 2

A hothouse grower of tomatoes and cucumbers prepared a first solution of water (27%), hydroxyethylene disphosphinic acid (18%), and hydrochloric acid (55%) in a first container. Water (85%) and sodium chlorite (15%) were mixed in a second container to form a second solution. The two solutions were mixed together in a container to form a food-grade composition. This composition was introduced into an irrigation network in which water flow was 760 gpm. The two chemical solutions were fed into the container at the rate of 1800 milliliters per hour. The reacted mixture was introduced into flowing irrigation water in an irrigation network. The

| PHOSPHONATE NAME | COMMERCIAL NAME | COMMON NAME | CAS # |
|---|---|---|---|
| Aminotri(methylemephosphonic Acid) | Dequest 2000 | ATMP | 6419-19-8 |
| 1-Hydroxyethylidene-1,1-diphosphonic Acid | Dequest 2010 | HEDP | 2809-21-4 |
| Ethylenediaminetetra (methylemephosphonic Acid) | Dequest 2041 | EDTMPA | 1429-50-1 |
| Hexamethylenediaminetetra (methylemephosphonic Acid) | Dequest 2054 | HMDTMPA | 38820-59-6 |
| Diethylenetriaminepenta (methylemephosphonic Acid) | Dequest 2060 | DETPMPA | 15827-60-8 |
| Bis(hexamethylene triamine penta(methylemephosphonic acid)) | Dequest 2090 | BHMPTMPA | 34690-00-1 |
| 2-Phosphonobutane-1,2,4-tricarboxylic Acid | Dequest 7000 | PBTC | 37971-36-1 |
| 2-Hydroxy Phosphonoacetic Acid | Belcor 575, Belclene 494 | HPA | 23783-26-8 |
| Phosphinocarboxylic Acid | Belclene 500, Belsperse 161 | PCA | 71050-62-9 |

See http://en.wikipedia.org/wiki/phosphonate

The following are some examples that are submitted for the purpose of making it easier to understand the invention:

EXAMPLE 1

Water (27.5%), phosphonobutanetricarboxylic acid (17.5%) and hydrochloric acid (55%) were mixed together in a solution. Water (85%) and sodium chlorite (15%) were mixed together to form a second solution. Sufficient contact time was allowed in a container to convert a substantial pormixture of the solutions in the container yielded approximately 0.5 ppm chlorine dioxide, approximately 1.0 ppm mixed oxidants, and approximately 1.0 ppm phosphonate. Water flow rates through the emitters increased from about 2400 liters per minute to about 3000 liters per minute within a five-week period of time. The treatment eliminated plant loss due to water and nutrient deprivation and cleaning and replacement of water emitters. Accelerated plant growth occurred and there was significant increase in food product (tomatoes) productivity and the health of the plant root system was improved.

EXAMPLE 3

A hothouse grower growing certified organic food crops (tomatoes), admixed a solution of 80% water, 15% citric acid and 5% of acetic acid and another solution of 85% water and 15% sodium chlorite into a container. Approximately 65 ounces of the citric acid, acetic acid and water solution and 30 ounces of the sodium chlorite and water solution were introduced into the container per hour. This solution comprised of certified organic components was introduced into 130 gpm flowing irrigation water to yield 1.75 ppm chlorine dioxide and 3.5 ppm mixed oxidants. Higher feed rates of the citric acid, acetic acid and water compound were fed to distort the source water minerals and iron based fertilizers so amorphous deposits would be formed, that are easily washed through to the irrigation emitters preventing plugging. After four weeks of treatment the pre-filters and emitters were clear of biofilms, mineral and fertilizer build up. Prior to treatment this grower experienced severe plugging of filtration equipment, irrigation emitters, plant loss, and reduced tomato production. Sufficient treatment levels were maintained even in this high organic environment. To achieve organic certification, this grower used a fish-meal based fertilizer, unlike many other oxidizers, chlorine dioxide selective reactant nature provided treatment residuals and unrestricted irrigation water flow. Fish oils were even removed by the application of chlorine dioxide, which assisted in preventing the plugging of the irrigation network.

EXAMPLE 4

A greenhouse grower cleaned existing crystalline mineral formation and biofilm from a section of a glass building housing plants and an irrigation network. The fragile new plant cuttings were covered with a porous fabric (reme), to protect the plants and soils from the erosive nature of the overhead irrigation network and disperse the water evenly over the plant starts and soils. Irrigation water was used that included 3 ppm chlorine dioxide, 7 ppm mixed oxidants, and 14 ppm phosphonate. The grower experienced the elimination of overhead sprinkler plugging due to biofilms, fertilizers and crystalline mineral structures. The bacteria count on the source-water dropped from $10^5$ to 0 at the emitter. The porous fabric (reme) remained free of algae, biofilm and crystalline mineral structures allowing proper application of water to the new plant cuttings and reduced diseases associated with growing in a unhygienic environment. The cleaned glass section remained free of crystalline mineral structures, algae and biofilm buildup and allowed sunlight infiltration for plant photosynthesis.

EXAMPLE 5

A greenhouse grower admixed eighty-eight ounces of a solution of 35% PBTC, 10% water and 55% HCL 20 Be with eighty-eight ounces of another solution of 15% sodium chlorite and 85% water in a chamber and fed the reacted composition into an overhead irrigation network within the greenhouse flowing at 50 gpm to yield 2 ppm chlorine dioxide and 4 ppm mixed oxidants and 4 ppm phosphonate. After two weeks of maintaining these treatment levels heavy biofilms and mineral deposits were removed from the windows, soil surfaces and concrete floors. Heavy biofilm buildup was removed from the planting tables. Clean windows allowed increased plant photosynthesis and overhead irrigating with the composition maintained a sterile environment for plant propagation and growing which greatly improved issues with plant disease.

EXAMPLE 6

A greenhouse grower experiencing severe contamination from pathogens and biofilm buildup in an ebb and flow irrigation application. An ebb and flow containment table was flooded with irrigation water, fertilizers and nutrients. Different species of plants required variable exposure time to uptake the water, fertilizer and nutrients. The water was drained from the irrigation table to a holding tank and recycled when the plants require additional water, fertilizer and nutrients. The watering tables became severely fouled with biofilms and mineral deposits. The plant roots exposed to the contaminated irrigation water developed a biofilm coating that turned the roots brown and hard, killing large portion of the plants on site and after shipping to greenhouse customers. When eighty-eight ounces of a solution of 35% PBTC, 10% water and 55% hydrochloric acid 20 Be was admixed with eighty-eight ounces of a solution of 15% sodium chlorite and 85% water in a chamber the resulting composition was fed to the irrigation water flowing at 125 gpm to the ebb and flow tables. Within 4 weeks complete removal of biofilms and mineral deposits occurred, the composition level in the recycled irrigation water was chlorine dioxide 2 ppm, mixed oxidants, 5 ppm and phosphonate 4 ppm. New plants irrigated with MDDA and BRA treatment, showed no signs of water borne disease and greatly improved the quality of the plants.

The MDDA distorts the mineral structure so that it becomes an amorphous deposit on the walls of the emitter passageways rather than a crystalline structure. The emitter passageways are not plugged because the amorphous deposit is easily washed away by the irrigation water flowing through the system. The presence of the MDDA alone, however, does not insure unrestricted-flowing water and nutrients to the plants do to issues with biofilms.

Chlorine dioxide functions essentially independent on pH and is an effective biocide in alkaline waters, an important advantage. It does not react with water and its efficacy is the same whether it is dissolved in solution or is in a gaseous state. Chlorine dioxide is extremely soluble in water, allowing it to penetrate and remove biofilms at concentration levels as low as 0.5 to 1.0 ppm. It has been found that the reaction of chlorite and/or chlorate salts and various acids produces residual oxidants (by products) depending upon the type and concentration of acids admixed which participate in preventing biofilms from plugging the emitters. The slow-release action of chlorine dioxide and its lower oxidation strength, combined with the mixture of byproduct oxidants provides thorough disinfection of very large, low-flow irrigation networks, at low treatment levels.

The mixed oxidants combined with the chlorine dioxide tend to be less reactive than strong oxidizers like chlorine gas and hydrogen peroxide in the presence of fertilizers, micronutrient metals, and organic materials, allowing residual oxidants to be maintained throughout the irrigation network for disinfecting in a cost effective manner. The combination of chlorine dioxide and the mixed oxidants, together with phosphonic acid compounds, mineral distorting acids and/or antiscalent polymers synergistically resolve all plugging issues and maintain unrestricted flow of the irrigation water and nutrients through the emitters to the plants. It also reduces the spread of pathogens and does not harm the environment like other chemicals that are used in the agricultural and golf course industries.

Irrigation water treated in accordance with the present invention can be used in environments where the plants being watered are closely surrounded by architectural structures without subjecting them to biofilm and/or crystalline mineral deposits that adversely effect their functionality and appearance and are difficult to remove. Sunlight penetration on glass with crystalline mineral structures and/or biofilm coatings where strong acids are used to remove these crystalline compounds could damage the glass. This also is true of mineral deposits on concrete, building and landscape structures.

The irrigation water treated in accordance with the present invention can be used on golf course greens, fairways, showplace lawns, etc. without adverse effect. As previously stated, it is common to add micronutrients to the irrigation water, and fertilizers, to promote plant growth. This can result in the soil base for the golf course greens and fairways becoming quite hard, and it can result in the creation of a film consisting of mineral/fertilizer and/or biofilm on the soil base that prevents rain and irrigation water from penetrating into the soil. It has been discovered that the BRA and/or MDDA that are delivered through the irrigation system conduits and emitters for the purpose of substantially maintaining unrestricted flow of irrigation water through the conduits and emitters will also prevent hardening of the soil and/or the formation of biological film in the soil that prevents the flow of rain and irrigation water to the soil.

Some irrigation networks are quite long and include a large number of emitters, some of which are spaced a considerable distance away from where the BRA and the MDDA are introduced into the system. Care should be taken in the selection of the oxidant (and quantity) used, so that there is a slow-release of oxygen of the oxidizer agent and this release continues throughout the full length of the irrigation system. It has been found that with slow oxidizer agent release the treatment is effective throughout the full extent of the irrigation network.

The disclosed embodiments are only examples of the present invention and, therefore, are non-limitive. It is to be understood that changes can be made in the particular structure, materials, steps and other features of the invention without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use of the doctrine of equivalents.

What is claimed is:

1. A method of substantially providing unrestricted flow of irrigation water through an irrigation network comprising water and discharge emitters and conduits that deliver irrigation water to the emitters, the emitters having small sized passageways susceptible to plugging, the method comprising the step of:
    admixing a biofilm reducing agent (BRA) and a mineral deposit distorting agent (MDDA) with the irrigation water, wherein the MDDA is selected from the group consisting of phosphonate compounds, phosphonic acid compounds, derivatives of phosphorus, blends of phosphonate phosphorus derivatives, and phosphonic acid compounds, citric acid, acetic acid, mineral acid and mixtures thereof;
    wherein the BRA is an oxidizer that substantially eliminates biofilm formation;
    wherein the MDDA causes mineral deposits to be amorphous; and
    wherein the BRA and the MDDA are admixed with the irrigation water in amounts sufficient to substantially eliminate biofilm formation in the emitters and produce amorphous mineral deposits in the emitters that are washed away by the irrigation water as it flows through the emitters, wherein plugging of the emitters is eliminated.

2. The method of claim 1 wherein the oxidizer is selected from the group consisting of chlorine, ozone, chlorine dioxide, hydrogen peroxide, hydroxyl peracetic acid, iodine, bromine, hydrogen dioxide, chlorate salts, chlorite salts, hypochlorite compounds and mixtures thereof.

3. The method of claim 2 wherein the oxidizer is produced as a byproduct of a reaction between a chlorite salt and an acid.

4. The method of claim 1 wherein the oxidizer is chlorine dioxide.

5. The method of claim 1 wherein the MDDA is a phosphonate.

6. The method of claim 5 wherein the phosphonate is selected from the group consisting of AMP, ATMP, HEDP, EDIMPA, HMDTMPA, DETPMPA, BHMPTMPA, PBTC, HPA, PCA, NTMP, and DTPMP.

7. The method of claim 5 wherein the phosphonate is 2 phosphonobutane-1,2,4 tricarboxylic acid (PBTC).

8. The method of claim 5 wherein the phosphonate is HEDP.

9. The method of claim 1 wherein the MDDA is selected from the group consisting of citric acid, acetic acid, mineral acid and mixtures thereof.

10. A method comprising the steps of:
    providing an irrigation network having at least one conduit leading to at least one emitter having a small sized passageway susceptible to plugging, wherein irrigation water is directed into and through the at least one conduit and into and through the at least one emitter;
    introducing an oxidant and a phosphonate into the irrigation water; and
    controlling the amount of oxidant and phosphonate introduced into the irrigation water, such that biofilm formation is substantially eliminated and amorphous mineral deposits in the emitter are washed away by the irrigation water, wherein plugging of the emitter is eliminated.

11. The method of claim 10 wherein the network is a stationary network.

12. The method of claim 10 wherein the network is a portable network.

* * * * *

UNITED STATES PATENT AND TRADEMARK OFFICE
CERTIFICATE OF CORRECTION

PATENT NO. : 7,601,266 B2 Page 1 of 1
APPLICATION NO. : 11/407414
DATED : October 13, 2009
INVENTOR(S) : Carl E. Iverson It is certified that error appears in the above-identified patent and that said Letters Patent is hereby corrected as shown below:

Column 8
Line 29, "EDIMPA" should read --EDTMPA--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,601,266 B2 | Page 1 of 1 |
| APPLICATION NO. | : 11/407414 | |
| DATED | : October 13, 2009 | |
| INVENTOR(S) | : Carl E. Iverson | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 364 days.

Delete the phrase "by 364 days" and insert -- by 540 days --.

Signed and Sealed this

Seventeenth Day of August, 2010

David J. Kappos
*Director of the United States Patent and Trademark Office*

(12) EX PARTE REEXAMINATION CERTIFICATE (9639th)
United States Patent
Iverson

(10) Number: US 7,601,266 C1
(45) Certificate Issued: May 9, 2013

(54) METHOD OF PROMOTING UNRESTRICTED FLOW OF IRRIGATION WATER THROUGH IRRIGATION NETWORKS

(75) Inventor: Carl E. Iverson, Olympia, WA (US)

(73) Assignee: CH₂O, Olympia, WA (US)

Reexamination Request:
No. 90/011,958, Oct. 14, 2011

Reexamination Certificate for:
Patent No.: 7,601,266
Issued: Oct. 13, 2009
Appl. No.: 11/407,414
Filed: Apr. 20, 2006

Certificate of Correction issued May 18, 2010
Certificate of Correction issued Aug. 17, 2010

(51) Int. Cl.
*C02F 1/76* (2006.01)
*C02F 5/14* (2006.01)

(52) U.S. Cl.
USPC ........... 210/696; 210/698; 210/699; 210/700; 210/747.5; 210/753; 210/754; 210/756; 210/758; 210/759; 210/760; 210/764; 422/28; 422/37

(58) Field of Classification Search
None
See application file for complete search history.

(56) References Cited

To view the complete listing of prior art documents cited during the proceeding for Reexamination Control Number 90/011,958, please refer to the USPTO's public Patent Application Information Retrieval (PAIR) system under the Display References tab.

*Primary Examiner* — Ling Xu

(57) ABSTRACT

A biofilm reducing agent (BRA) and a mineral deposit distorting agent (MDDA) are admixed to irrigation water in amounts sufficient to substantially eliminate biofilm formation in the emitters (14) of an irrigation system (10) and produce amorphous mineral deposits in the emitters that are easily washed away by the irrigation water as it flows through the emitters (14). The BRA may be an oxidizer selected from the group consisting of chlorine, ozone, chlorine dioxide, hydrogen peroxide, hydroxy peracitic acid, iodine, bromine, hydrogen dioxide, chlorate salts, chlorite salts and hypochlorite compounds and mixtures thereof. The MDDA is a phosphonate selected from the group comprising AMP, ATMP, HEDP, EDTMPA, HMDTMPA, DETPMPA, BHMPTMPA, PBTC, HPA, PCA, NTMP, and DTPMP.

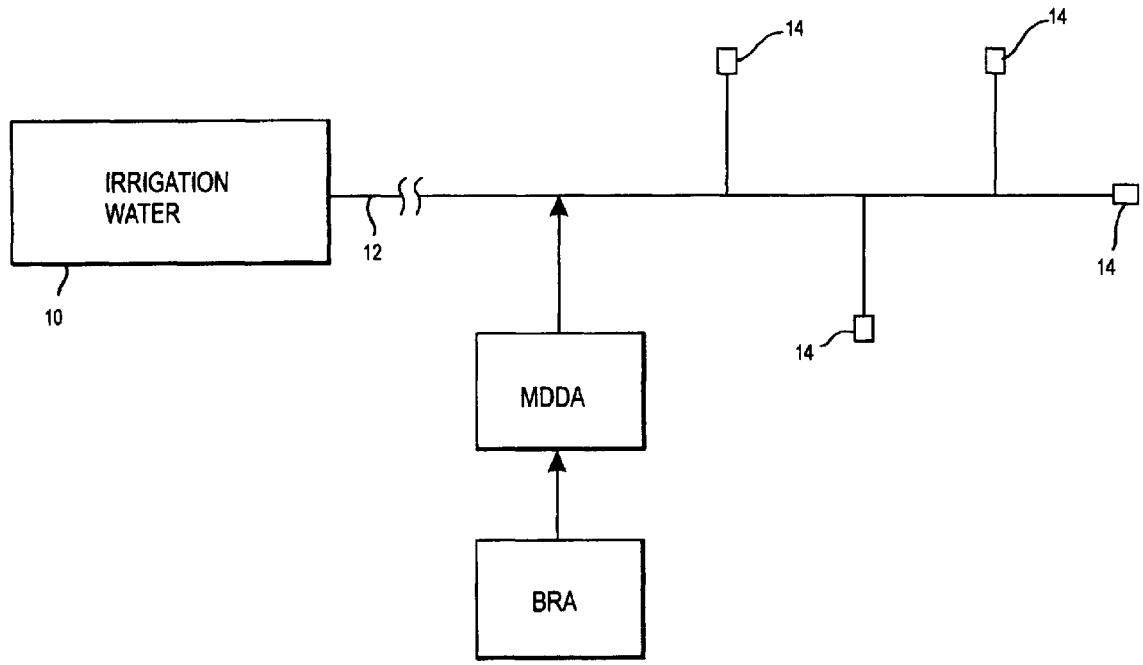

**EX PARTE
REEXAMINATION CERTIFICATE
ISSUED UNDER 35 U.S.C. 307**

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 11-12 are cancelled.

Claims 1 and 10 are determined to be patentable as amended.

Claims 2-9, dependent on an amended claim, are determined to be patentable.

1. A method of substantially providing unrestricted flow of irrigation water through an irrigation network [comprising] *designed to supply irrigation water and optional fertilizer and micronutrients to plants, wherein the irrigation network comprises irrigation* water and discharge emitters and conduits that deliver *the* irrigation water to the emitters, the emitters having small sized passageways susceptible to plugging, the method comprising the step of:

admixing a biofilm reducing agent (BRA) and a mineral deposit distorting agent (MDDA) with the irrigation water, wherein the MDDA is selected from the group consisting of phosphonate compounds, phosphonic acid compounds, derivatives of phosphorus, blends of phosphonate *and* phosphorus derivatives, [and phosphonic acid compounds,] citric acid, acetic acid, mineral acid and mixtures thereof;

wherein*:* the BRA is an oxidizer that substantially eliminates biofilm formation;

[wherein] the MDDA causes mineral deposits to be amorphous; [and wherein] the BRA and the MDDA are admixed with the irrigation water in amounts sufficient to substantially eliminate biofilm formation in the emitters and produce amorphous mineral deposits in the emitters that are washed away by the irrigation water as it flows through the emitters[.] *;*

*the BRA and the MDDA are admixed with the irrigation water such that a ratio of mixed oxidants to chlorine dioxide in the irrigation water discharged from the emitters is 2:1 to 2.5:1; and*

[wherein] plugging of the emitters is eliminated.

10. A method comprising the steps of:

providing an irrigation network [having] *designed to supply irrigation water to plants, wherein the irrigation network comprises* at least one conduit leading to at least one emitter having a small sized passageway susceptible to plugging, wherein *the* irrigation water is directed into and through the at least one conduit and into and through the at least one emitter;

introducing an oxidant and a phosphonate into the irrigation water *such that a ratio of mixed oxidants to chlorine dioxide in the irrigation water discharged from the at least one emitter is 2:1 to 2.5:1*; and controlling the amount of oxidant and phosphonate introduced into the irrigation water, such that biofilm formation is substantially eliminated and amorphous mineral deposits in the emitter are washed away by the irrigation water, wherein plugging of the emitter is eliminated.

\* \* \* \* \*